(12) United States Patent
Strong (10) Patent No.: US 12,114,033 B2
(45) Date of Patent: Oct. 8, 2024

(54) APPARATUS, SYSTEMS AND METHODS FOR PRESENTATION MANAGEMENT OF MEDIA CONTENT

(71) Applicant: DISH Technologies L.L.C., Englewood, CO (US)

(72) Inventor: Stephen Strong, Dunwoody, GA (US)

(73) Assignee: DISH Technologies L.L.C., Englewood, CO (US)

( * ) Notice: Subject to any disclaimer, the term of this patent is extended or adjusted under 35 U.S.C. 154(b) by 246 days.

(21) Appl. No.: 17/726,359

(22) Filed: Apr. 21, 2022

(65) Prior Publication Data

US 2022/0248078 A1 Aug. 4, 2022

Related U.S. Application Data

(60) Continuation of application No. 16/777,753, filed on Jan. 30, 2020, now Pat. No. 11,323,762, which is a continuation of application No. 16/153,058, filed on Oct. 5, 2018, now Pat. No. 10,555,029, which is a division of application No. 13/115,729, filed on May 25, 2011, now Pat. No. 10,097,875.

(51) Int. Cl.
| | |
|---|---|
| *A61H 19/00* | (2006.01) |
| *H04N 21/422* | (2011.01) |
| *H04N 21/433* | (2011.01) |
| *H04N 21/4402* | (2011.01) |
| *H04N 21/442* | (2011.01) |
| *H04N 21/845* | (2011.01) |

(52) U.S. Cl.
CPC ... *H04N 21/42201* (2013.01); *H04N 21/4331* (2013.01); *H04N 21/440281* (2013.01); *H04N 21/44218* (2013.01); *A61H 19/00* (2013.01); *A61H 19/44* (2013.01); *A61H 2201/501* (2013.01); *A61H 2201/5058* (2013.01); *A61H 2230/00* (2013.01); *A61H 2230/065* (2013.01); *A61H 2230/105* (2013.01); *A61H 2230/505* (2013.01); *H04N 21/8456* (2013.01)

(58) Field of Classification Search
CPC .. A61H 19/00; A61H 19/44; A61H 2201/501; A61H 2201/5058; A61H 2230/00
See application file for complete search history.

(56) References Cited

U.S. PATENT DOCUMENTS

| | | | |
|---|---|---|---|
| 3,296,737 | A | 1/1967 | Doyle et al. |
| 3,592,469 | A | 7/1971 | Glass et al. |
| 4,373,918 | A | 2/1983 | Berman |
| 4,771,344 | A | 9/1988 | Fallacaro et al. |

(Continued)

FOREIGN PATENT DOCUMENTS

| | | |
|---|---|---|
| EP | 0347415 B1 | 11/1994 |
| EP | 1582965 A1 | 10/2005 |

(Continued)

*Primary Examiner* — Christine H Matthews
(74) *Attorney, Agent, or Firm* — Perkins Coie LLP (57) ABSTRACT

Systems and methods are operable to control presentation of an erotica-related media content event. An exemplary embodiment is a media device that receives information from a user sensor that is configured to sense a physical characteristic of a user viewing the erotica-related media content event, and automatically changes presentation of the erotica-related media content event based on the received information corresponding to the sensed physical characteristic of the viewing user.

20 Claims, 2 Drawing Sheets

(56) References Cited

U.S. PATENT DOCUMENTS

| | | |
|---|---|---|
| 4,846,689 A | 7/1989 | Day |
| 4,954,697 A | 9/1990 | Kokubun et al. |
| 5,022,886 A | 6/1991 | Jenkins |
| 5,174,759 A | 12/1992 | Preston et al. |
| 5,178,573 A | 1/1993 | Smith |
| 5,429,140 A | 7/1995 | Burdea et al. |
| 5,485,176 A | 1/1996 | Ohara et al. |
| 5,515,424 A | 5/1996 | Kenney |
| 5,607,339 A | 3/1997 | Kramer |
| 5,739,811 A | 4/1998 | Rosenberg et al. |
| 5,844,547 A | 12/1998 | Minakuchi et al. |
| 5,845,263 A | 12/1998 | Camaisa et al. |
| 5,991,085 A | 1/1999 | Rallison et al. |
| 5,984,880 A | 11/1999 | Lander et al. |
| 5,999,168 A | 12/1999 | Rosenberg et al. |
| 6,062,865 A | 5/2000 | Bailey |
| 6,062,997 A | 5/2000 | Seymour |
| 6,267,599 B1 | 7/2001 | Bailey |
| 6,290,565 B1 | 9/2001 | Galyean, III et al. |
| 6,319,010 B1 | 11/2001 | Kikinis |
| 6,368,268 B1 | 4/2002 | Sandvick et al. |
| 6,554,679 B1 | 4/2003 | Shackelford et al. |
| 6,604,976 B2 | 8/2003 | Lenkoff |
| 6,695,770 B1 | 2/2004 | Choy et al. |
| 6,714,213 B1 | 3/2004 | Lithicum et al. |
| 6,719,604 B2 | 4/2004 | Chan |
| 6,747,632 B2 | 6/2004 | Howard |
| 6,793,619 B1 | 9/2004 | Blumenthal |
| 6,857,878 B1 | 2/2005 | Chosack et al. |
| 7,084,876 B1 | 8/2006 | Fogel et al. |
| 7,438,681 B2 | 10/2008 | Kobashikawa et al. |
| 7,503,892 B2 | 3/2009 | Squicciarini |
| 7,762,945 B2 | 7/2010 | Blumenthal |
| 2003/0036678 A1 | 2/2003 | Abbassi |
| 2003/0190858 A1 | 10/2003 | Thomas |
| 2005/0014560 A1 | 1/2005 | Blumenthal |
| 2005/0223237 A1 | 10/2005 | Barletta et al. |
| 2006/0079732 A1 | 4/2006 | Blumenthal |
| 2006/0270897 A1 | 11/2006 | Homer |
| 2010/0045595 A1 | 2/2010 | Bakke |
| 2019/0045257 A1 | 2/2019 | Strong |
| 2020/0169777 A1 | 5/2020 | Strong |

FOREIGN PATENT DOCUMENTS

| | | |
|---|---|---|
| TW | 200919210 | 5/2009 |
| WO | 8806077 A2 | 8/1988 |
| WO | 0235842 A2 | 5/2002 |
| WO | 2009053869 A2 | 4/2009 |

APPARATUS, SYSTEMS AND METHODS FOR PRESENTATION MANAGEMENT OF MEDIA CONTENT

PRIORITY CLAIM

This patent application is a Continuation of U.S. Non-Provisional patent application Ser. No. 16/777,753, filed Jan. 30, 2020, entitled "APPARATUS, SYSTEMS AND METHODS FOR PRESENTATION MANAGEMENT OF MEDIA CONTENT", which is a Continuation of U.S. Non-Provisional patent application Ser. No. 16/153,058, filed Oct. 5, 2018, entitled "APPARATUS, SYSTEMS AND METHODS FOR PRESENTATION MANAGEMENT OF MEDIA CONTENT", which is a Divisional of U.S. Non-Provisional patent application Ser. No. 13/115,729, filed May 25, 2011, entitled "APPARATUS, SYSTEMS AND METHODS FOR PRESENTATION MANAGEMENT OF EROTICA-RELATED MEDIA CONTENT", now U.S. Pat. No. 10,097,875 issued Oct. 9, 2018, the contents of which are incorporated herewith in its entirety.

BACKGROUND

Media devices, such as a set top box, stereo, television, computer system, game system, or the like, may be used to present erotica-related media content events. Teledildonic devices may be configured to receive operating instructions such that the teledildonic device may give erotic pleasure to a viewing user. The teledildonic device operating instructions may be synchronized to the presented erotica-related media content event such that actions performed by actors of the erotica-related media content event are simulated through the teledildonic device. Accordingly, the viewing user experiences erotic stimulation based on the currently presented subject matter of the presented erotica-related media content event.

However, the viewing user is limited to controlling the erotica-related media content event through manual interventions, such as initiating various play functions. Exemplary play functions include fast forward, fast rewind, jump forward, jump backward, or the like. If the viewing user is otherwise preoccupied with their teledildonic device, it may be very inconvenient for the viewing user to also manage presentation of the erotica-related media content event. Accordingly, there is a need in the arts to provide a more user-friendly method and apparatus for presentation control of the erotica-related media content event.

SUMMARY

Systems and methods of controlling presentation of an erotica-related media content event are disclosed. An exemplary media device embodiment receives information from a user sensor that is configured to sense a physical characteristic of a user viewing the erotica-related media content event, and automatically changes presentation of the erotica-related media content event based on the received information corresponding to the sensed physical characteristic of the viewing user.

BRIEF DESCRIPTION OF THE DRAWINGS

Preferred and alternative embodiments are described in detail below with reference to the following drawings.

DETAILED DESCRIPTION

Figure 1:
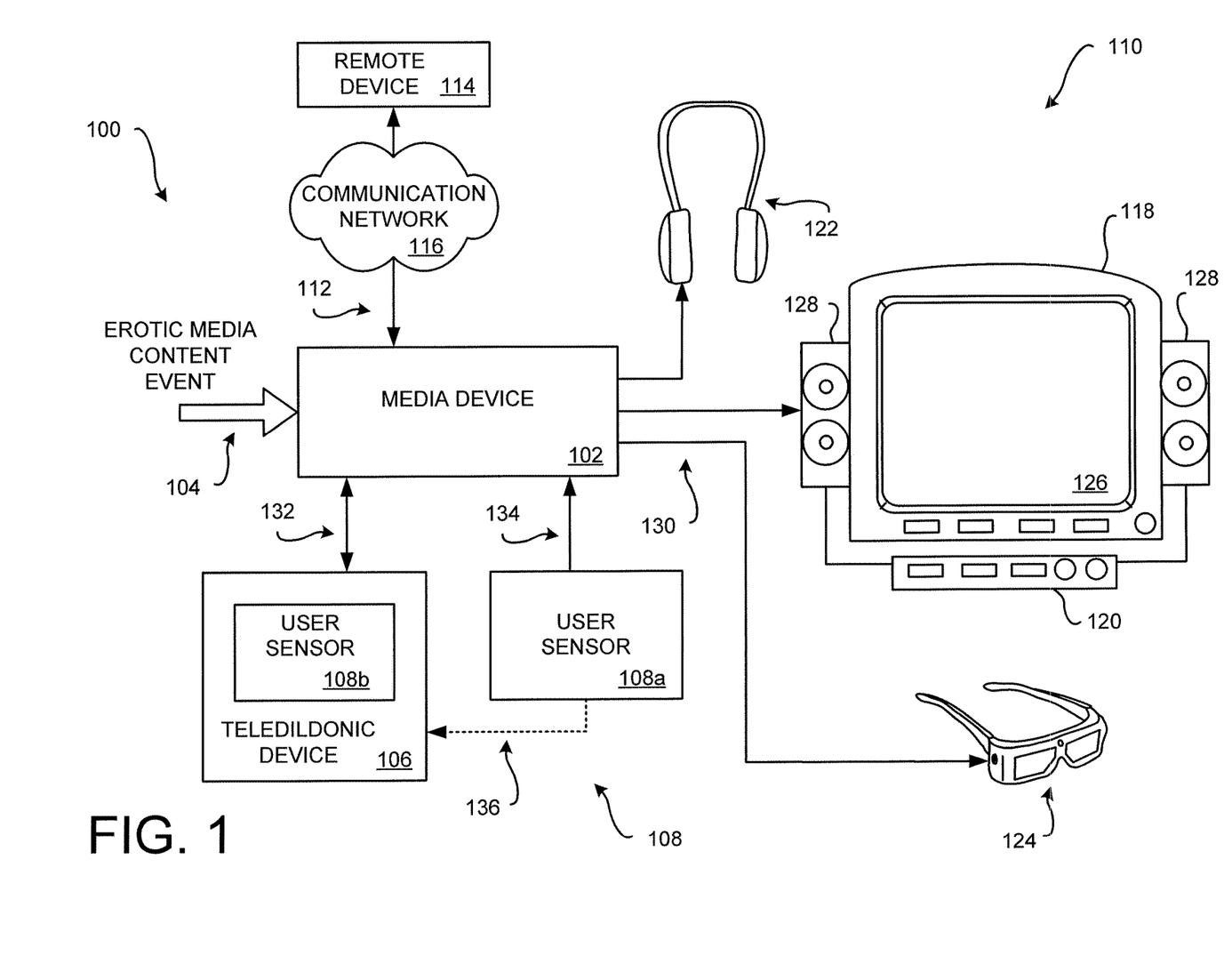
FIG. 1 is a block diagram of an embodiment of a teledildonic device interface system 100 implemented in a media device.

FIG. 1 is a block diagram of an embodiment of a teledildonic device interface system 100 implemented in a media device 102, such as, but not limited to, a set top box (STB). Embodiments of the teledildonic device interface system 100 may be implemented in other media devices, such as, but not limited to, a stereo, a surround-sound receiver, a radio, a television (TV), a digital video disc (DVD) player, a digital video recorder (DVR), a game playing device, or a personal computer (PC) that is configured to receive, process, and/or present an erotica-related media content event 104.

Embodiments of the teledildonic device interface system 100 are configured to automatically adjust presentation of the erotica-related media content event 104 based upon sensed physical characteristics of a viewing user who is interacting with their teledildonic device 106. The automatic changes to presentation of the erotica-related media content event 104 and/or the teledildonic device 106 are implemented when the viewing user is in, or enters into, a highly excited state. The highly excited state of the viewing user corresponds to a high level of sexual arousal of the viewing user. The highly excited state of the viewing user is determined from the sensed physical characteristics of the viewing user. Embodiments may also be optionally configured to automatically adjust one or more operating states or characteristics of the teledildonic device 106.

The teledildonic device 106 is a haptic-type device that is configured to provide physical sensation and/or stimulation to a user of the teledildonic device 106. Generally, the physical sensation and/or stimulation provided by the teledildonic device 106 to the viewing user is erotic in nature. Teledildonic devices 106 may be configured for either male users or female users. Some types of teledildonic devices 106 can be manipulated remotely by another party. Some teledildonic devices 106 are configured to operate in concert with prerecorded movies to which the actions of the teledildonic device 106 are synchronized by means of a previously-written script. Other teledildonic devices 106 may be called "bluedildonics," which allow the teledildonic device 106 to be controlled remotely via a Bluetooth connection.

In the various embodiments, one or more user sensors 108 sense one or more physical characteristics of the viewing user. A user sensor 108a may be a stand-alone device that is physically coupled to, or is in proximity to, the viewing user. Another exemplary user sensor 108b is an integrated component of the teledildonic device 106 (and may be interchangeably referred to as a teledildonic user sensor). Information corresponding to the sensed physical characteristic of the viewing user is communicated to the media device 102. Based on information provided by the one or more user sensors 108, embodiments of the teledildonic device interface system 100 determine if automatic changes to presentation of the erotica-related media content event 104 and/or the teledildonic device 106 should be implemented.

For example, the viewing user may be watching and listening to the erotica-related media content event 104 being presented on a media presentation system 110. The erotica-related media content event 104 may be provided by the media device 102. Concurrently, the viewing user may be interacting with their teledildonic device 106 which is receiving operating instructions from information included with the erotica-related media content event 104 and/or from information provided by another source, such as a remote operator, a second viewing user, or from a remote location.

For example, an exemplary user sensor 108 may be monitoring the pulse rate of the viewing user as they are watching and listening to the presented erotica-related media content event 104. During a particularly erotic scene of the erotica-related media content event 104, pulse rate user sensor 108 may sense a rise in the pulse rate of the viewing user, thus indicating that the viewing user is in, or is entering into, a highly excited state.

However, the particularly erotic scene of the erotica-related media content event 104 that has excited the viewing user may be relatively short. After the particularly erotic scene has concluded, the subject matter of the erotica-related media content event 104 may change to a less erotic scene. Accordingly, the viewing user may otherwise become relatively disinterested in the next presented scene of the erotica-related media content event 104. Thus, the user may drop out of their highly excited state. This change may be undesirable to the viewing user.

However, embodiments of the teledildonic device interface system 100 are configured to adjust presentation of the erotica-related media content event 104 to maintain and/or to enhance the highly excited state of the viewing user. As the particularly erotic scene is nearing its conclusion, and based upon the sensed highly excited state of the viewing user, an exemplary embodiment of the teledildonic device interface system 100 is configured to automatically change presentation of the erotica-related media content event 104 so as to help the viewing user to maintain, or even enhance, their highly excited state.

An exemplary embodiment of the teledildonic device interface system 100 implements a jump back function such that presentation of all of, or a portion of, the particularly erotic scene is automatically repeated. The repeated presentation occurs with a minimal intervening delay. The repetition of the erotic scene may occur any number of times based on the sensed physical conditions of the viewing user.

Further, the operating instructions or commands provided to the teledildonic device 106, which may be operating in synchronism with the repeated particularly erotic scene, may also be repeated or otherwise maintained. For example, the teledildonic device 106 may be operated to provide additional amount of, or a lesser amount of, erotic stimulation to the viewing user to help the viewing user to maintain, or even enhance, their highly excited state.

Presentation of the erotica-related media content event 104 is automatically controlled until there is a detectable change in one or more sensed physical conditions of the viewing user that would tend to indicate that the viewing user is no longer interested in continued or repeated presentation of the particularly erotic scene. That is, embodiments of the teledildonic device interface system 100 returns to normal presentation of the erotica-related media content event 104 when sensed physical characteristics of the viewing user tends to indicate that presentation of the particularly erotic scene should no longer be repeated.

For example, in the event that the monitored pulse rate of the viewing user has decreased during presentation of the particularly erotic scene, and/or is below some pulse rate threshold, embodiments of the teledildonic device interface system 100 are configured to return to the continued presentation of the next scene of the erotica-related media content event 104. That is, continued or repeated presentation of the particularly erotic scene ends.

Some embodiments are configured to access and present a different erotic scene of the erotica-related media content event 104. For example, the different erotic scene of the erotica-related media content event 104 may be stored in a suitable memory medium so that it is readily accessible. Alternatively, a special locator, tag, or the like may delineate the different erotic scene that is included in the erotica-related media content event 104. In response to detecting the conclusion of the currently presented erotic scene, concurrently with sensed physical conditions of the viewing user indicating that the viewing user is in a highly excited state, the teledildonic device interface system 100 accesses and presents the different erotic scene upon conclusion of the currently presented erotic scene.

Alternatively, or additionally, a different erotic scene from a different erotica-related media content event 104 may be accessed and presented. For example, the viewing user of the media device 102 may have previously stored one or more different erotic scenes that they particularly favor. In response to detecting the conclusion of the currently presented erotic scene, concurrently with sensed physical conditions of the viewing user indicating a highly excited state, the teledildonic device interface system 100 accesses and presents the different erotic scene upon conclusion of the currently presented erotic scene. In some embodiments, the media device 102 may be configured to establish a communication link 112 to an external device 114, such as an internet site. The different erotic scene may be accessed from the external device 114 for presentation, via a communication network 116.

The exemplary media device 102 is communicatively coupled to one or more different devices of the media presentation system 110 that includes a visual display device 118, such as a television (hereafter, generically a TV), and an audio presentation device 120, such as a surround sound receiver (hereafter, generically, a stereo or receiver). Other types of output devices may also be coupled to the media device 102, including those providing any sort of visual and/or audible stimuli sensible by the viewing user, such as the exemplary head phones 122 and/or the exemplary head mounted device (HMD) 124

The video portion of the erotica-related media content event 104 is displayed on the display 126 of the visual display device 118. Alternatively, the video portion of the erotica-related media content event 104 may be presented to the viewing user on a viewer of the HMD 124. The HMD 124 may be configured to present three dimensional (3-D) video content.

The audio portion of the streamed program content is reproduced as sounds by one or more TV speakers (not shown). Alternatively, or additionally, the audio portion of the erotica-related media content event 104 may reproduced as sounds by a plurality of speakers 128 of the audio device 120 and/or the head phones 122. The volume output of the audio portion may be controllable at the visual display device 118, and/or may be controllable at the media device 102.

In some embodiments, the volume level of the reproduced audio portion of the erotica-related media content event 104 may be adjusted when the sensed physical conditions of the viewing user indicating that the viewing user is in a highly excited state. For example, the volume level may be increased.

The media device 102 may be communicatively coupled to the devices of the media presentation system 110 using any suitable communication link 130 and/or communication medium. An exemplary communication link 130 is a wire-based connector that communicates the video and audio portions of the erotica-related media content event 104 to the devices of the media presentation system 110. Alternatively, or additionally, the communication link 130 may be a wireless link that employs a suitable wireless communication medium, such as radio frequency (RF) and/or infrared (IR) signals.

The teledildonic device 106 may be optionally communicatively coupled to the media device 102 using a suitable communication link 132. The communication link 132 may employ a wire-based medium or a wireless medium. In embodiments of the teledildonic device 106 that have one or more user sensors 108b integrated therein, the user sensors 108b may communicate information corresponding to the sensed physical characteristics of the viewing user to the media device 102 over the communication link 132.

Alternatively, or additionally, one or more stand-alone user sensors 108a may be used to sense physical characteristics of the viewing user. Such user sensors 108a may be communicatively coupled to the media device 102 using the communication link 134. communication link 134 may employ a wire-based medium or a wireless medium.

Alternatively, the stand-alone user sensor 108a may be communicatively coupled to the teledildonic device 106 using a suitable communication link 136. The communication link 136 may employ a wire-based medium or a wireless medium to communicate the information corresponding the sensed physical characteristics to the media device 102.

Figure 2:
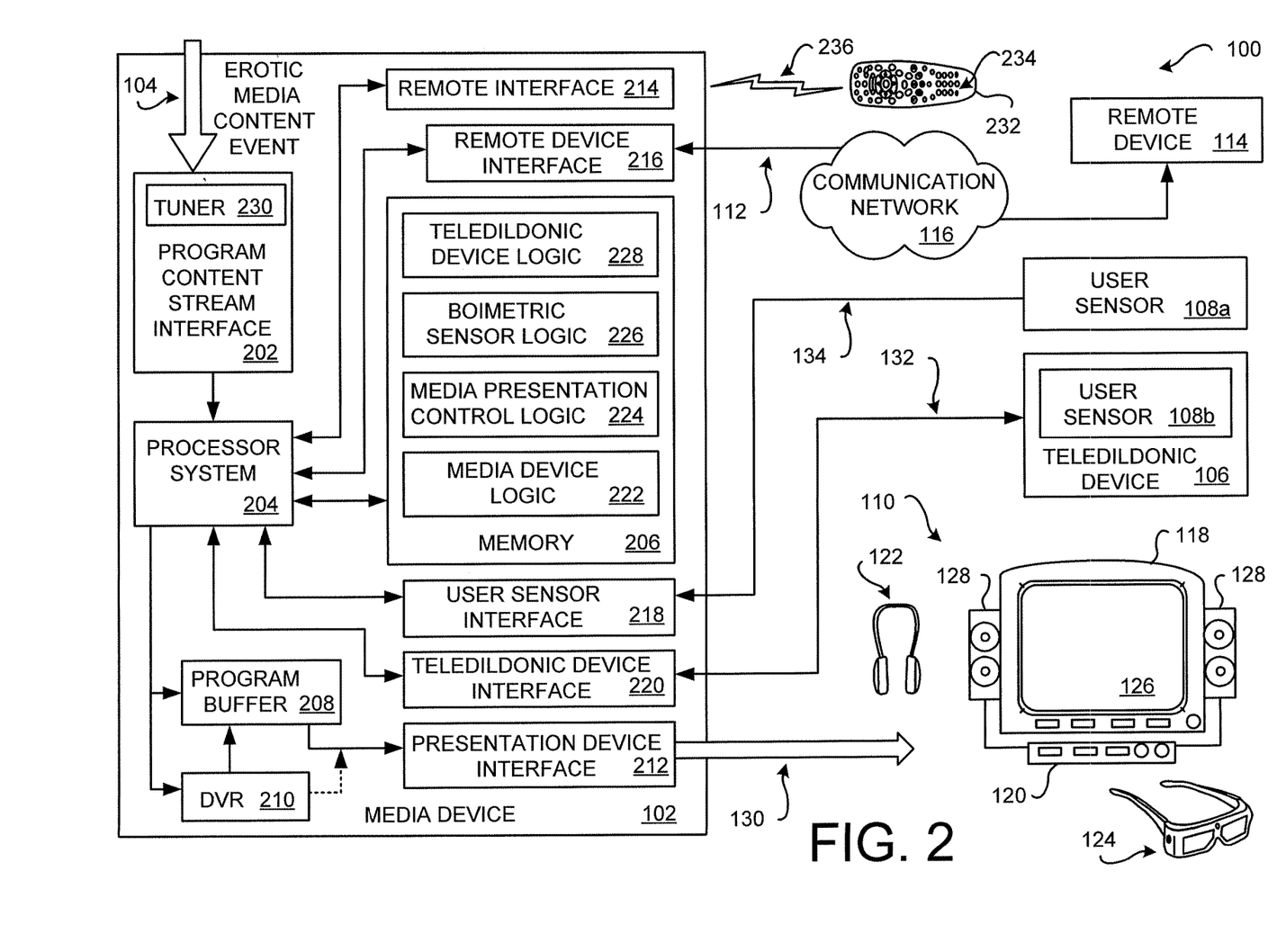
FIG. 2 is a block diagram showing greater detail of an exemplary media device embodiment.

FIG. 2 is a block diagram showing greater detail of an exemplary media device 102. The non-limiting exemplary media device 102 comprises a media content stream interface 202, a processor system 204, a memory 206, a program buffer 208, an optional digital video recorder (DVR) 210, a presentation device interface 212, an optional remote interface 214, an optional remote device interface 216, an optional user sensor interface 218, and an optional teledildonic device interface 220. The memory 206 comprises portions for storing the media device logic 222, the media presentation control logic 224, the user sensor logic 226, and the teledildonic device logic 228. In some embodiments, the media device logic 222, the media presentation control logic 224, the user sensor logic 226, and/or the teledildonic device logic 228 may be integrated together, and/or may be integrated with other logic. In other embodiments, some or all of these memory and other data manipulation functions may be provided by and using remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. A media content provider may provide the erotica-related media content event 104 in one or more media content streams multiplexed together in one or more transport channels. The transport channels with the erotica-related media content event 104 are communicated to the media device 102 from a media system sourced from a remote head end facility (not shown) operated by the media content provider. For example, if the media content provider provides programming via a satellite-based communication system, the media device 102 is configured to receive one or more broadcasted satellite signals detected by an antenna (not shown). Alternatively, or additionally, the erotica-related media content event 104 can be received from one or more different sources, such as, but not limited to, a cable system, a radio frequency (RF) communication system, or the Internet.

The erotica-related media content event 104 is received by the media content stream interface 202. One or more tuners 230 in the media content stream interface 202 selectively tune the media content stream transporting the erotica-related media content event 104 in accordance with instructions received from the processor system 204. The processor system 204, executing the media device logic 222 and based upon a request for presentation of the erotica-related media content event 104 as specified by the viewing user, parses out media content associated with the erotica-related media content event 104. The erotica-related media content event 104 is then assembled into a stream of video and/or audio information which may be stored by the program buffer 208 such that the erotica-related media content event 104 can be streamed out to the devices of the media presentation 110, via the presentation device interface 212. Alternatively, or additionally, the erotica-related media content event 104 may be saved into the DVR 210 for later presentation. The DVR 210 may be directly provided in, locally connected to, or remotely connected to, the media device 102.

Alternatively, the erotica-related media content event 104 may be received from a memory medium that is coupled to, or accessible by, the media device 102. For example, the erotica-related media content event 104 may be stored in a digital video disc (DVD) that is accessed by a DVD player, may be stored in a video cassette recorder (VCR) tape that is accessible by a VCR, may be stored in a flash type memory of a uniform serial bus (USB) memory device, memory card or the like, or may be stored in any other suitable memory medium. The memory medium and/or the accessing device may be communicatively coupled to the media device 102 to provide access to the stored erotica-related media content event 104.

Alternatively, the media device 102 may establish a communication link 112 to a remote device 114, via the remote device interface 216. Then, the erotica-related media content event 104 may be downloaded from the remote device 114 to the media device 102 over the communication network 116. The communication network 116 is illustrated as a generic communication system. In some embodiments, the communication network 116 comprises a cellular telephone system, such as a radio frequency (RF) wireless system. Accordingly, the media device 102 includes a suitable transceiver. Alternatively, the network 138 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, other embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, some embodiments of the media device 102 may be configured to communicate over combination systems having a plurality of segments which employ different formats for each segment that employ different technologies on each segment.

The exemplary media device 102 may be further configured to receive commands from the viewing user. The commands may be generated by a remote control 232. The remote control 232 includes one or more controllers 234 on its surface. The user, by actuating one or more of the controllers 234, causes the remote control 232 to generate and transmit commands, via a wireless signal 236, to the media device 102. The wireless signal is received by the remote interface 214. The received commands control the media device 102 and/or control the devices of the media presentation system 110. The wireless signal 236 may be an IR signal or an RF signal.

In the various embodiments, the remote control 232 may be further configured to enable or disable the teledildonic device interface system 100. Thus, the viewing user may choose to view the erotica-related media content event 104 without the benefit of the teledildonic device 106. Alternatively, the viewing user may choose to view the erotica-related media content event 104 with the benefit of the teledildonic device 106, but without the benefit of the presentation control provided by the teledildonic device interface system 100. One or more of the controllers 234 may be configured to enable or disable operation of the teledildonic device interface system 100. Alternatively, or additionally, a graphical user interface (GUI) may be presented on the display 126 such that the viewing user, by operating the remote control 232, is able to navigate about the presented GUI and configure operation of the teledildonic device interface system 100.

Additionally, or alternatively, the remote control 232 may be configured to control one or more operating functions and/or characteristics of the teledildonic device 106. For example, the viewing user may reconfigure the teledildonic device interface system 100 to operate the teledildonic device 106 to provide more or less physical stimulation. Thus, the remote control 232 may be a universal type remote that is configured to control operation of multiple devices.

The above processes performed by the media device 102 are generally implemented by the processor system 204 while executing the media device logic 222. Thus, the media device 102 may perform a variety of functions in addition to controlling presentation of the erotica-related media content event 104 based on the information corresponding to the sensed physical characteristics of the viewing user that has been provided by the one or more user sensors 108.

For example, but not limited to, the media device logic 222 may be configured to establish an Internet-type communication link 112 to the external device 114, via the remote device interface 216. Then, the media device logic 222 may be configured to permit the user to navigate about the Internet web site operated by the external device 114 so as to access the erotica-related media content event 104.

As another example, the media device 102 may be a personal computer or the like. Accordingly, the media device logic 222 may comprise the operating system used by the personal computer.

As yet another example, the media device 102 may be a set top box that is configured to present other types of media content events. Accordingly, the media device logic 222 may comprise the logic that enables presentation of the different types of media content events. In some embodiments, the media device 102 may be a gaming-type device.

When the viewing user is watching the erotica-related media content event 104 and is concurrently enjoying their teledildonic device 106, the user sensors 108 are monitoring various physical characteristics of the viewing user. Information corresponding to the sensed physical characteristics of the viewing user is then communicated to the media device 102.

For external user sensors 108a, the information corresponding to the sensed physical characteristics of the viewing user is received at the user sensor interface 218. Accordingly, the user sensor interface 218 is configured to communicatively couple to the particular type of user sensor 108a that is monitoring the viewing user.

The example teledildonic device 106 includes one or more internally integrated user sensors 108b. Accordingly, the information corresponding to the sensed physical characteristics of the viewing user may be communicated to the media device 102 using the same communication medium used to provide control signals to the teledildonic device 106.

In some embodiments, a separate communication link (not shown) between the integrated user sensors 108b of the teledildonic device 106 may be used to communicate the information corresponding to the sensed physical characteristics of the viewing user to the media device 102. For example, but note limited to, some media devices 102 may not be configured to interact with the teledildonic device 106. Such embodiments of the teledildonic device interface system 100 monitor the sensed physical characteristics of the viewing user, and only control presentation of the erotica-related media content event 104 based on the information corresponding to the sensed physical characteristics of the viewing user.

A variety of different types of user sensors 108 may be used by the various embodiments of the teledildonic device interface system 100 to provide information corresponding to the sensed physical characteristics of the viewing user. Non-limiting examples of user sensors 108 are configured to detect body temperature, heart rate, pulse rate, pupil dilation, sweating, tearing, and/or other fluidic discharges. An exemplary user sensor 108 may be configured to monitor brain activity of the viewing user. Some user sensors 108 may be configured to monitor environmental conditions in proximity to the viewing user, such as humidity near the user or dampness of the apparel worn by the viewing user.

The processor system 204, executing the user sensor logic 226, processes and interprets the received information corresponding to the sensed physical characteristics of the viewing user. Based upon the sensed physical characteristics, automatic changes to presentation of the erotica-related media content event 104 and/or the teledildonic device 106 are made.

In some embodiments, changes in the sensed physical characteristics of the viewing user may be used to determine if presentation of the erotica-related media content event 104 should be controlled. For example, the magnitude of a change in a sensed physical characteristic over some duration could be determined by the processor system 204. If the change magnitude is greater than a predefined threshold, and/or if the determined change occurs within some predefined duration, then the processor system 204 may conclude that the viewing user is in a highly excited state.

For example, but not limited to, if the viewing user's heart rate increases from a resting rate to 180 beats per minute, and/or changes by 30% or more, then the teledildonic device interface system 100 may determine that the viewing user is likely in a highly excited state. Accordingly, an exemplary embodiment of the teledildonic device interface system 100 automatically changes presentation of the erotica-related media content event 104 so as to help the viewing user to maintain, prolong, and/or increase their highly excited state. Any suitable change in a sensed physical characteristic of the viewing user may be used by the various embodiments to determine that the viewing user is in a highly excited state.

In other situations, a magnitude of the sensed physical characteristics of the viewing user may be used to determine if presentation of the erotica-related media content event 104 should be controlled. In such embodiments, if the magnitude is greater than a predefined threshold, then the processor system 204 may conclude that the viewing user is in a highly excited state. For example, but not limited to, if the viewing user's heart rate reaches or exceeds 180 beats per minute, then the viewing user is likely in a highly excited state. That is, the changed presentation of the erotica-related media content event occurs in response to the heart rate of the viewing user increasing to a predetermined value which corresponds to a highly excited state of the viewing user. Accordingly, an exemplary embodiment of the teledildonic device interface system 100 automatically changes presentation of the erotica-related media content event 104 so as to help the viewing user to maintain, prolong, and/or increase their highly excited state. Any suitable magnitude of a sensed physical characteristic of the viewing user may be used by the various embodiments to determine that the viewing user is in a highly excited state.

Similarly, changes in, or a magnitude of, a sensed physical characteristic of the viewing user may be used to return to normal presentation of the erotica-related media content event 104. For example, an embodiment of the teledildonic device interface system 100 may be automatically repeating presentation of a particularly erotic scene to maintain the highly excited state of the viewing user. At some later time, the sensed physical characteristics of the viewing user may change so as to indicate that the viewing user is no longer in a highly excited state, such as after the viewing user experiences a sexual orgasm. For example, but not limited to, the viewing user's heart rate may decrease to a low rate (such as 80 beats per minute), may decrease by some predefined amount during a predefined duration, or may decrease by some percentage. In response to determining the change in the sensed physical characteristic of the viewing user, the processor system 204 may determine that the viewing user is no longer in a highly excited state. Accordingly, normal presentation of the erotica-related media content event 104 may resume presentation of the erotica-related media content event beginning at a subsequent scene of the erotica-related media content event.

In the various embodiments, the processor system 204, executing the media presentation control logic 224, adjusts or changes presentation of the erotica-related media content event 104 after determining that the viewing user is in, or has entered into, a highly excited state. In an exemplary embodiment, the start and end of the particular erotic scene that has excited the viewing user is demarked by a suitable identifier, such as a time stamp, a tag, or the like. That is, the processor system 204 is able to determine the start and end of the erotic scene.

In response to determining that the viewing user is in, or has entered into, a highly excited state, the processor system 204 rewinds or otherwise returns the erotica-related media content event 104 to the start of the erotic scene once the end of the erotic scene has been reached.

In some embodiments, the return to the start of the erotic scene occurs a single time. Alternatively, the process or rewinding and/or returning to the start of the erotic scene (after the current presentation of the erotic scene concludes) may be repeated any number of times so long a the viewing user remains in the highly excited state.

In some embodiments, presentation of the erotica-related media content event 104 jumps backward, that is "rewinds," by a predefined duration. The predefined rewind duration may be user adjustable or may be fixed. For example, the predefined rewind duration may be set at three minutes of presentation time. Thus, presentation of the erotica-related media content event 104 jumps back by three minutes so that all of, or a portion of, the highly erotic scene is repeated.

In some embodiments, the rewind duration may be adjustable by the processor system 204 based on one or more sensed physical characteristics of the viewing user. For example, but not limited to, the processor system 204 may define the rewind duration based upon a duration in which the user sensors 108 sense a transformation of the viewing user from a normal or resting state to the highly excited state. That is, when the viewing user initially becomes highly aroused, or begins to become highly aroused, the processor system 204 may determine the rewind duration based on that time or point in the erotica-related media content event 104.

In some embodiments, upon determining that the viewing user is entering into a highly excited state, or is in a highly excited state, the erotic scene may be stored in the buffer 208 and/or the DVR 210 as a discrete segment. When the erotic scene concludes, current presentation of the erotica-related media content event 104 is paused or is otherwise stopped. The stored erotic scene segment may then be retrieved and presented from its start. When the viewing user is no longer in the highly excited state, the presentation of the erotica-related media content event 104 may be resumed from its paused or stopped location, or may be resumed at a subsequent scene, at another selected scene, or at another point of the erotica-related media content event.

In some embodiments, upon determining that the viewing user is entering into a highly excited state, or is entering into a highly excited state, the different erotic scene may be accessed from the erotica-related media content event 104, from the buffer 208, and/or the from the DVR 210. When the currently presented erotic scene concludes, presentation of the erotica-related media content event 104 is paused or is otherwise stopped, and the different erotic scene is accessed and is presented from its start. For example, a different erotic scene with the same actors may be available for presentation. When the viewing user is no longer in the highly excited state, the presentation of the erotica-related media content event 104 may be resumed from its paused or stopped location, or may be resumed at a subsequent scene, at another selected scene, or at another point of the erotica-related media content event.

In some embodiments, the different erotic scene may be accessed and retrieved from the remote device 114. For example, but not limited to, the retrieved different erotic scene may be retrieved from the remote device 114 that is operating as an Internet site. Or, the different erotic scene may be retrieved from an memory medium that is accessible by the media device 102.

In embodiments wherein the media device 102 is communicatively coupled to the teledildonic device 106, one or more operating characteristics of the teledildonic device 106 may be modified or changed by the media device 102. In such embodiments, the processor system 204, executing the teledildonic device logic 228, may change operation of the teledildonic device 106 so as to increase physical stimulation of the viewing user in response to determining that the viewing user is in a highly excited state.

Alternatively, the processor system 204 may change operation of the teledildonic device 106 so as to decrease physical stimulation of the viewing user. Accordingly, the highly excited state of the viewing user may be prolonged while the media presentation system 110 changes presentation of the erotica-related media content event 104.

Information to control operation of the teledildonic device 106 may be obtained from a variety of sources. In some embodiments, control information that is configured to control the teledildonic device 106 may be included in the erotica-related media content event 104, such as in metadata or as separate data. In some situations, the control information may be pre-stored in the memory 206 and accessed as needed to maintain, heighten, or decrease the arousal state of the viewing user. In other situations, the remote device 114 may provide the control information that is used by the media device 102 to control the teledildonic device 106.

In some embodiments, the viewing user may not be using the teledildonic device 106 while viewing the erotica-related media content event 104. Embodiments of the teledildonic device interface system 100 may be configured to automatically change presentation of the erotica-related media content event based on the received information corresponding to the sensed physical characteristic of the viewing user in the absence of the teledildonic device 106.

It should be emphasized that the above-described embodiments of the teledildonic device interface system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device for controlling presentation of an erotica-related media content event, comprising:
 a user sensor interface configured to receive information from a user sensor,
  wherein the user sensor is configured to sense at least one physical characteristic of a user viewing the erotica-related media content event,
  wherein the at least one physical characteristic includes a pupil dilation of the user,
  wherein the information corresponds to a magnitude of the at least one physical characteristic;
 a presentation device interface configured to communicate the erotica-related media content event to a visual display device, wherein the erotica-related media content event is presentable by the visual display device to the viewing user;
 a haptic device configured to provide a physical sensation to the viewing user; and
 a processor system communicatively coupled to the user sensor interface, the haptic device, and the presentation device interface, and configured to:
  determine that the viewing user is entering into a highly excited state based on the received information from the user sensor while the user is viewing a currently presented erotic scene of the erotica-related media content event, wherein the viewing user is entering into the highly excited state is determined when the magnitude of the at least one physical characteristic changes from a value that is less than a predefined threshold to a magnitude that is greater than the predefined threshold; and
  operate the haptic device in response to determining that the viewing user has entered the highly excited state.

2. The media device of claim 1, wherein the haptic device is synchronized with the presentation of the erotic scene of the erotica-related media content event.

3. The media device of claim 1, wherein the processor system is further configured to determine that the viewing user is leaving the highly excited state based on the received information from the user sensor and present a different erotic scene in response to determining that the viewing user has left the highly excited state prior to conclusion of the currently presented erotic scene of the erotica-related media content event.

4. The media device of claim 1, wherein the user sensor is configured to sense a heart pulse rate of the viewing user, and wherein the processor system is further configured to monitor the heart pulse rate of the viewing user, wherein the information from the user sensor corresponds to the sensed heart pulse rate of the viewing user.

5. The media device of claim 1, wherein the user sensor is configured to sense a sweating of the viewing user, and wherein the processor system is further configured to monitor sweating of the viewing user, wherein the information from the user sensor corresponds to the sensed sweating of the viewing user.

6. The media device of claim 1, wherein the user sensor is configured to sense a body temperature of the viewing user, and wherein the processor system is further configured to monitor the body temperature of the viewing user, wherein the information from the user sensor corresponds to the sensed body temperature of the viewing user.

7. A media device for controlling presentation of an erotica-related media content event, comprising:
 a user sensor interface configured to receive information from a user sensor,
  wherein the user sensor is configured to sense at least one physical characteristic of a user viewing the erotica-related media content event,
  wherein the at least one physical characteristic includes a pupil dilation of the user,
  wherein the information corresponds to a magnitude of the at least one physical characteristic;
 a presentation device interface configured to communicate the erotica-related media content event to a visual display device, wherein the erotica-related media content event is presentable by the visual display device to the viewing user;
 a haptic device configured to provide a physical sensation to the viewing user; and
 a processor system communicatively coupled to the user sensor interface, the haptic device, and the presentation device interface, and configured to:
  determine that the viewing user is entering into a highly excited state based on the received information from the user sensor while the user is viewing a currently presented erotic scene of the erotica-related media content event, wherein the viewing user is entering into the highly excited state is determined when the magnitude of the at least one physical characteristic changes from a value that is less than a predefined threshold to a magnitude that is greater than the predefined threshold;
  operate the haptic device in response to determining that the viewing user has entered the highly excited state;
  establish a communication link to a remote device over a communication network after presentation of the currently presented erotic scene of the erotica-related media content event begins;
  retrieve a different erotic scene from the remote device; and
  present the different erotic scene after an end of the currently presented erotic scene of the erotica-related media content event in response to determining that the viewing user remains in the highly excited state.

8. The media device of claim 7, wherein the haptic device is synchronized with the presentation of the erotic scene.

9. The media device of claim 7, wherein the different erotic scene is from a different erotica related media content event.

10. The media device of claim 7, wherein the remote device comprises an internet site.

11. The media device of claim 7, wherein the processor system is further configured to determine that the viewing user is leaving the highly excited state based on the received information from the user sensor and present the different erotic scene in response to determining that the viewing user has left the highly excited state prior to the end of the currently presented erotic scene of the erotica-related media content event.

12. The media device of claim 7, wherein the user sensor is configured to sense a heart pulse rate of the viewing user, and wherein the processor system is further configured to monitor the heart pulse rate of the viewing user, wherein the information from the user sensor corresponds to the sensed heart pulse rate of the viewing user.

13. The media device of claim 7, wherein the processor system is further configured to monitor the pupil dilation of the viewing user, wherein the information from the user sensor corresponds to the sensed pupil dilation of the viewing user.

14. A media device for controlling presentation of an erotica-related media content event, comprising:
a teledildonic interface configured to receive information from a user sensor that is integrated into a teledildonic device,
wherein the user sensor is configured to sense at least one physical characteristic of a user viewing the erotica-related media content event,
wherein the at least one physical characteristic includes a pupil dilation of the user,
wherein the information corresponds to a magnitude of the at least one physical characteristic, and wherein the teledildonic device includes a haptic device;
a presentation device interface configured to communicate the erotica-related media content event to a visual display device, wherein the erotica-related media content event is presentable by the visual display device to the viewing user; and
a processor system communicatively coupled to the teledildonic interface and the presentation device interface, and configured to:
determine that the viewing user is entering into a highly excited state based on the received information from the user sensor while the user is viewing a currently presented erotic scene of the erotica-related media content event, wherein the viewing user is entering into the highly excited state is determined when the magnitude of the at least one physical characteristic changes from a value that is less than a predefined threshold to a magnitude that is greater than the predefined threshold; and
operate the haptic device in response to determining that the viewing user has entered the highly excited state.

15. The media device of claim 14, wherein the teledildonic device is synchronized with the presentation of the erotic scene.

16. The media device of claim 14, wherein the processor system is further configured to determine that the viewing user is leaving the highly excited state based on the received information from the user sensor and present a different erotic scene in response to determining that the viewing user has left the highly excited state, and wherein the different erotic scene is from a different erotica related media content event.

17. The media device of claim 14, wherein the processor system is further configured to determine that the viewing user is leaving the highly excited state based on the received information from the user sensor and present a different erotic scene in response to determining that the viewing user has left the highly excited state prior to conclusion of the currently presented erotic scene of the erotica-related media content event.

18. The media device of claim 14, wherein the user sensor is configured to sense a heart pulse rate of the viewing user, and wherein the processor system is further configured to monitor the heart pulse rate of the viewing user, wherein the information from the user sensor corresponds to the sensed heart pulse rate of the viewing user.

19. The media device of claim 14, wherein the user sensor is configured to sense a sweating of the viewing user, and wherein the processor system is further configured to monitor sweating of the viewing user, wherein the information from the user sensor corresponds to the sensed sweating of the viewing user.

20. The media device of claim 14, wherein the user sensor is configured to sense a brain activity of the viewing user, and wherein the processor system is further configured to monitor the brain activity of the viewing user, wherein the information from the user sensor corresponds to the sensed brain activity of the viewing user.

* * * * *